United States Patent Office 3,446,763
Patented May 27, 1969

3,446,763
PREPARATION OF POLYESTER BY ESTER INTERCHANGE AND CONDENSATION REACTIONS USING MANGANESE OCTOATE AS CATALYST
Yuzi Okuzumi, Cuyahoga Falls, Ohio, assignor to The Goodyear Tire & Rubber Company, Akron, Ohio, a corporation of Ohio
No Drawing. Filed Apr. 5, 1965, Ser. No. 445,718
Int. Cl. C08g 17/013, 17/003
U.S. Cl. 260—22
19 Claims

ABSTRACT OF THE DISCLOSURE

This invention relates to an improved process for ester interchange reactions and for preparing polyesters by ester interchange and condensation reactions using manganese octoate as catalyst and a combination manganese octoate with divalent compounds such as a calcium compound.

---

This invention relates to an improved method for preparing highly polymeric linear condensation polyesters of dicarboxylic acids and glycols.

The prior art to which this invention relates shows various methods of preparing linear condensation polyesters. A great number of catalysts that can be used have been disclosed. The prior art also discloses that combinations of catalysts can be employed to produce improved results in some instances. However, it is apparent that results that may be obtained cannot be predicted.

Of great significance in selecting catalysts for use in preparing polyesters is the avoidance of side reactions which lead to the formation of by-products of foreign matter in the polyester being produced. This is especially critical in the case of those polyesters to be used to form films and to form fibers for textile uses. The extent of the undesirable side reactions is usually high when the reaction rate is slow or when the catalyst concentration is too high.

The process employed in preparing the polyesters is the ester interchange process in which bis esters of dicarboxylic acids are reacted in the presence of catalysts with a glycol under conditions facilitating removal of the alkanol from the bis ester by ester interchange with the glycol to form glycol esters or low molecular weight polymers thereof. This is referred to as the first stage of the polyester preparation and can be conducted under a wide range of conditions using different types of apparatus. For example, one mol of the bis ester and from 1 to 2.5 or more mols of the glycol can be placed in a reaction vessel equipped with a column and a distilling head, the reaction vessel being heated at a temperature which permits the alkanol to pass through the column with the glycol being retained by the column and returned to the reaction vessel whereby substantially all of the alkanol which can theoretically be produced is removed during this first stage of the polyester preparation which results in a substantially monomeric prepolymer.

The second stage of the polyester preparation involves condensing the product produced during the first stage whereby glycol is removed and long chain polyester molecules are produced. The polymerization is accomplished under conditions facilitating the removal of glycol so that the ultimate ratio of dicarboxylic acid units to glycol units in the polymer formed is essentially 1 to 1. The polymerization is carried out until the polymer formed is of high molecular weight. Generally it will be carried out until the polymer has an intrinsic viscosity of at least 0.4 and usually until it has an intrinsic viscosity of 0.5 or higher.

The polymerization of the first stage product starts generally during the earlier phases by heating at a temperature above the boiling point of the glycol at whatever pressure is required for removal of the glycol through the condenser or other device attached to the reaction vessel. As the glycol is removed the temperature is raised and the pressure is gradually reduced so that temperatures considerably above the boiling point of the glycol but below the decomposition temperature of the product and pressures below about 10 millimeters of mercury pressure are attained. Generally the pressure is as low as the apparatus can produce and is usually less than 1 millimeter of mercury pressure.

It is an object of this invention to provide catalysts which are very active and accelerate the ester interchange reaction between a glycol and an ester of a dicarboxylic acid. It is another object of the invention to provide a process for preparing polymeric linear condensation polyesters using a catalyst composition which produces rapid reaction rates at all stages of the preparation of the polyesters being formed from the condensation of esters of dicarboxylic acids with a glycol. It is still another object of the invention to provide a process for preparing polymeric linear condensation polyesters which produces polymeric linear condensation polyesters having a low degree of color.

Other objects will be apparent as the description of the invention proceeds.

According to this invention it has been found that manganese salts of octanoic acids are highly effective for promoting the ester interchange reaction between a glycol and an ester of a dicarboxylic acid.

In each of Examples 1 through 3 a glass reaction tube approximately 35 centimeters long having an inside diameter of 38 millimeters, equipped with a side arm, a nitrogen gas inlet tube and stirrer was charged with 50 grams of dimethyl terephthalate, 40 grams of ethylene glycol and the catalyst combination indicated. Nitrogen gas was slowly passed into the reaction tube and over the mixture. The mixture was stirred and heated by means of a vapor bath which surrounds the tube and having a temperature of 240° C. The time required to collect one-half the theoretical amount of methanol released from the dimethyl terephthalate in the ester exchange reaction in each instance was noted and recorded as in Table I.

TABLE I.—TIME REQUIRED TO COLLECT 50% OF THEORETICALLY OBTAINABLE METHANOL

| Example No. | Name of Catalyst | Conc. of Catalyst as Metal | | |
|---|---|---|---|---|
| | | 0.01% | 0.003% | 0.0006% |
| 1 | Mn-di-acetate | 9 min | 19 min | 250 min. |
| 2 | Mn-di-2-ethylhexoate | 8 min | 15 min | 30 min. |
| 3 | Mn-di-n-octoate | 7 min | 15 min | 25 min. |

The above table clearly illustrates that octanoic acid salts of manganese are nearly ten times more effective than the manganese acetate at the lower concentration. Various manganese compounds were tested as catalyst for the ester interchange reaction of dimethyl trephthalate with tethramethylene glycol. In these tests 54.4 grams of dimethyl terephthalate, 56.4 grams of tetramethylene glycol and an amount of catalyst sufficient to provide 0.0135 gram of manganese calculated as manganese metal were charged into an apparatus of the type used in the examples above. Nitrogen gas was slowly passed into the reaction tube and over the mixture. The mixture was stirred and heated by means of a vapor bath which surrounded the reaction tube and the amount of distillate collected at various times was noted. Each material was tested for catalytic activity at 197° C. and at 244° C. The data obtained are set out in Table II below.

TABLE II

| Reaction Time in Minutes | Catalyst | | | | | | | |
|---|---|---|---|---|---|---|---|---|
| | Mn-Acetate | | Mn-Caproate | | Mn-Octoate | | Mn-Stearate | |
| | Ex. 4—197° C., Ml. of distillate | Ex. 5—244° C., Ml. of distillate | Ex. 6—197° C., Ml. of distillate | Ex. 7—244° C., Ml. of distillate | Ex. 8—197° C., Ml. of distillate | Ex. 9—244° C., Ml. of distillate | Ex. 10—197° C., Ml. of distillate | Ex. 11—244° C., Ml. of distillate |
| 15 | 4.8 | 9.7 | 4.5 | 9.2 | 6.0 | 11.5 | 2.5 | 6.0 |
| 30 | 7.5 | 14.7 | 7.0 | 14.0 | 8.5 | 16.0 | 4.0 | 10.0 |
| 60 | 9.0 | 23.5 | 8.5 | 22.5 | 10.3 | 25.0 | 7.8 | 16.0 |
| 90 | 9.5 | 30.8 | 9.4 | 30.0 | 11.5 | 32.8 | 8.7 | 23.0 |
| 120 | 10.2 | 36.0 | 10.8 | 35.0 | 13.0 | 38.0 | 9.4 | 30.0 |
| 150 | 10.8 | 37.5 | 11.0 | 37.5 | 13.5 | 42.0 | 10.0 | 35.5 |
| 180 | 11.5 | 39.1 | 11.4 | 39.0 | 14.5 | 43.0 | 10.8 | 39.0 |
| 240 | 12.2 | 40.0 | 12.0 | 40.5 | 15.5 | 43.5 | 11.5 | 40.0 |

The above table clearly indicates that manganese octoate is an excellent catalyst and causes the ester interchange reaction to proceed faster than does manganese compounds of lower or higher alkanoic acids.

Furthermore, polycondensation of the ester interchange products containing the catalyst of this invention produces a highly polymeric polyester resin of very low color which has a high melting point, low carboxylic number and improved thermal and hydrolytic stability. This is shown in the following examples in which the polycondensation reaction was carried out in the following manner.

0.0123 gram of antimony acetate (calculated as metal) was added to the ester interchange product which was obtained according to the procedure used in Examples 1 through 3. The mixture was then subjected to the polycondensation at 282° C. and 0.05 millimeter of mercury pressure for 120 minutes. The properties of polyesters obtained using various manganese compounds as catalyst are shown in Table III.

Intrinsic viscosity of each of the samples was determined in a 60/40 phenol-tetrachloroethane mixed solvent at 30.0° C.

Hydrolytic stability of each of the samples was determined as follows: A sample of the resin was cut into particles having a diameter of about two millimeters. About one gram of these particles was heated at 140° C. at one millimeter of mercury pressure for 16 hours. This sample was then transferred to a 400 milliliter stainless steel beaker containing 20 milliliters of distilled water. The beaker was placed in a steam sterilizer and heated at 120° C. for six hours. The polymer was recovered from the water by filtration, rinsed with acetone and dried for three hours at 60° C. at atmospheric pressure and then for 16 hours at 140° C. and one millimeter of mercury pressure. The intrinsic viscosity of the thus treated polymer was determined in a 60/40 phenol-tetrachloroethane mixed solvent at 30.0° C.

TABLE III

| Ex. No. | Ester Exchange Catalyst, Metal Content $1.63 \times 10^{-3}$ grams calculated as manganese | Reaction Time, Min. | | Polymer Properties | | | | | |
|---|---|---|---|---|---|---|---|---|---|
| | | Ester Exchange | Condensation | Carboxylic Content, eq/10⁶ g. | Intrinsic Viscosity | Melting Point, ° C. | Thermal Stability (percent BB) | Hydrolytic Stability (percent BB) | Color of Product |
| 12 | Manganese Acetate | 105 | 120 | 15.1 | .638 | 266 | .06 | .10 | Trace Green. |
| 13 | Manganese Caproate | 137 | 120 | 14.2 | .595 | 266 | .05 | .08 | Clear White. |
| 14 | Manganese di-n-Octoate | 90 | 120 | 13.7 | .712 | 266 | .05 | .08 | Do. |
| 15 | Manganese-di-2-Ethyl-hexoate | 84 | 120 | 12.7 | .620 | 268 | .05 | .09 | Do. |
| 16 | Manganese di-n-Caproate | 128 | 120 | 15.0 | .567 | 263 | .08 | .16 | Slightly Yellow. |
| 17 | Manganese-Linoleate | 133 | 120 | 17.2 | .550 | 264 | .06 | .11 | Do. |
| 18 | Manganese-Stearate | 160 | 120 | 17.2 | .581 | 264 | .06 | .09 | Do. |
| 19 | Manganese-Naphthenate | 185 | 120 | 15.8 | .583 | 265 | .07 | .08 | Do. |

The intrinsic viscosity of each of the samples was determined in a 60/40 phenol-tetrachloroethane mixed solvent at 30° C.

The carboxyl content of each of the samples of resins was found by determining the acid number using standard procedure and expressing the acid number as the number of equivalents of free carboxyl groups per 10⁶ grams of polymer.

Thermal stability of each of the samples was determined as follows: A sample of the resin was ground to pass a 20 mesh screen and dried for 16 hours at 135° C. and 1 millimeter of mercury pressure. The dried samples were placed in a petri dish and aged at 280° C. in an electrically heated oven in the presence of air for one day. Intrinsic viscosity of the sample was then determined. The decrease in intrinsic viscosity on aging in this manner expressed as percent broken bonds gives a measure of the thermal stability of the resin.

The equation used for calculating the percent broken bonds (BB) is:

$$\%BB = \frac{[N]_o - [N]_a}{[N]_o \times [N]_a} \times K \times 100$$

wherein: K=a variable relationship dependent on the molecular weight—intrinsic viscosity relationship,
$[N]_o$=intrinsic viscosity of the initial sample,
$[N]_a$=intrinsic viscosity of the aged sample.

The percent broken linkages due to the hydrolysis treatment was calculated for each sample of resin using the following formula:

$$\%BB = \frac{[N]_o - [N]_h}{[N]_o \times [N]_h} \times C \times 100$$

in which:

$[N]_o$ is the intrinsic viscosity of the original polymer,
$[N]_h$ is the intrinsic viscosity of the hydrolyzed polymer, and
C is a variable relationship dependent on the molecular weight-intrinsic viscosity relationship.

The effect of phosphite stabilizer on polyester resins prepared using the manganese catalysts was determined in the following tests. In these tests 5 pounds of dimethyl terephthalate and 3.57 pounds of ethylene glycol and an amount of catalyst containing 0.0756 gram of manganese (calculated as manganese metal) were charged into a glass reaction vessel. Nitrogen gas was slowly passed into the vessel and over the mixture. The mixture was stirred and reacted at about 240° C. until the ester interchange reaction was complete. The mixture was then transferred to a stainless steel reaction vessel, and the amount of antimony trioxide equivalent to 0.021 gram of antimony metal was added. The mixture was slowly heated to 280° C. as the pressure was reduced to about one millimeter of mercury pressure. After five minutes of condensation 9.1 grams of triphenyl phosphite were added. The condensation was then carried out until the polymer was polymerized to high molecular weight. Data obtained in these tests are set out in Table IV.

EXAMPLE 29

The melt polymerization was carried out in the same manner as illustrated in Example 28, except 0.01 percent of magnesium octoate was used in the place of calcium octoate. The polymer obtained possessed an intrinsic

TABLE IV

| Example No. | 1st Stage Catalyst | 2d Stage Catalyst | | React. Time, Stage— | | Color | | | I.V. | M.P., °C. | —COOH | T.S. | H.S. |
|---|---|---|---|---|---|---|---|---|---|---|---|---|---|
| | | | | 1st | 2d | Rd. | a | b | | | | | |
| 20 | Mn-Acetate | Sb$_2$O$_3$ | None | 2:50 | 5:00 | 65.8 | −0.6 | +8.9 | .808 | 264 | 29 | .112 | .226 |
| 21 | do | Sb$_2$O$_3$ | TPP | 2:45 | 5:30 | 61.5 | −0.9 | +6.3 | .805 | 264 | 18 | .040 | .056 |
| 22 | Mn-Octoate | Sb$_2$O$_3$ | None | 2:25 | 4:24 | 67.3 | −0.5 | +8.2 | .803 | 266 | 23 | .080 | .130 |
| 23 | do | Sb$_2$O$_3$ | TPP | 2:20 | 4:45 | 65.9 | −1.0 | +5.4 | .789 | 266 | 8 | .040 | .030 |
| 24 | Mn-Acetate | Sb-glycolate | None | 2:45 | 2:30 | 66.7 | +0.3 | +6.2 | .620 | 264 | 24 | .134 | .185 |
| 25 | do | do | TPP | 2:55 | 2:40 | 71.6 | −0.5 | +4.4 | .609 | 264 | 17 | .090 | .150 |
| 26 | Mn-Octoate | do | None | 2:20 | 2:20 | 70.2 | 0.0 | +5.8 | .604 | 265 | 14 | .110 | .130 |
| 27 | do | do | TPP | 2:17 | 2:34 | 73.7 | −0.6 | +3.5 | .612 | 266 | 7 | .060 | .070 |

TPP=Triphenyl Phosphite; Rd.=Reflectance; +a=Red; −a=Green; +b=Yellow; −b=Blue; I.V.=Intrinsic Viscosity; M.P.=Melting Point; —COOH=Carboxyl Number per 10$^6$ Gr.; T.S.=Thermal Stability; H.S.=Hydrolytic Stability.

The color readings shown in the foregoing table were obtained by using a Gardner Color Difference Meter. The measurement is given using a tri-stimulus method. Lower +b value indicates an improvement in whiteness of the polyester resin. Table IV shows that the manganese octoate with triphenyl phosphite examples had faster polycondensation time, the polymers were whiter and had lower carboxyl numbers, improved thermal and hydrolytic stability compared with similar polymers prepared with manganese acetate and triphenyl phosphite.

The examples illustrate the use of triphenyl phosphite with manganese octoate catalyst. Other phosphites can be used, such as aryl phosphites, alkyl phosphites, cycloalkyl phosphites and aralkyl phosphites. Representative examples of phosphites are tricresyl phosphite, triphenyl phosphite, dibutyl phenyl phosphite, phenyl dibutyl phosphite, trioctyl phosphite, tricyclohexyl phosphite and the like. The amount of the phosphite compounds used is usually very small. Generally the amount used will be from about 0.001 to 0.5 percent, preferably in the range of from 0.001 to 0.1 percent based on the dicarboxylic acid esters used. The phosphite can be added to the reactants at any stage of the reaction. Thus it may be added at the beginning of the ester interchange reaction or to the final polymers. It is preferably added during the condensation reaction before the condensation is completed. The addition of a divalent metal compound to the manganese octoate catalyst system improves the productivity of the catalyst system and the polyesters produced have improved properties. The divalent metal compounds useful in combination with the manganese catalysts are compounds of the metals of Group II of the periodic table of the elements such as calcium, strontium, barium, berylium, magnesium, zinc and cadmium. In the following examples the combination of the manganese catalyst with another divalent metal compound was tested according to the procedure shown in Example 28 below.

EXAMPLE 28

Fifty grams of dimethyl terephthalate, 40 grams of ethylene glycol, 0.03 percent of manganese octoate and 0.01 percent of calcium octoate based on the dimethyl terephthalate were placed in a reaction tube of the type described in Example 1 and stirred and reacted at 240° C. for one hour under a nitrogen atmosphere. Then 0.025 percent of antimony oxide was added to the reaction mixture and polymerization was carried out at 282° C. and 0.05 millimeter of mercury pressure for 85 minutes. The polymer formed had a melting point of 269° C. and an intrinsic viscosity of 0.731 measured in a 60/40 phenol-tetrachloroethane mixed solvent at 30° C. The free carboxyl content of the polymer was determined and found to be 12.8 equivalents per 10$^6$ grams of polymer. The polymer had excellent thermal and hydrolytic stability showing only 0.062 percent and 0.087 percent of broken bonds respectively.

viscosity of .746, melting point of 269° C., carboxyl number of 14.9, thermal and hydrolytic stabilities of 0.066 and 0.089 percent broken bonds respectively.

The effect of the divalent Group II metal compound has been illustrated particularly with respect to the use of calcium and magnesium octoate. Other compounds of the Group II metals such as the oxides, carbonates, glycolates and salts of organic acids can be used. The preferred compounds are glycolates and salts of aliphatic carboxylic acids, particularly monocarboxylic acids, hydroxy monocarboxylic acids and dicarboxylic acids. Representative examples of the glycolates are calcium glycolate, calcium 1,3-propylene glycolate, calcium octylene glycolate, barium glycolate, barium 1,3-propylene glycolate, barium octylene glycolate, strontium glycolate, strontium 1,3-propylene glycolate, strontium octylene glycolate, magnesium glycolate, magnesium 1,3-propylene glycolate, magnesium octylene glycolate, zinc glycolate, zinc 1,3-propylene glycolate, zinc octylene glycolate and other glycolates of the Group II metals. Representative examples of the salts of aliphatic acids are calcium acetate, calcium propionate, calcium octoate, barium acetate, barium propionate, barium octoate, strontium acetate, strontium propionate, strontium octoate, magnesium acetate, magnesium propionate, magnesium octoate, zinc acetate, zinc propionate and zinc octoate. Representative examples of salts of hydroxy carboxylic acids are calcium lactate, calcium alpha hydroxy butyrate, calcium beta hydroxy butyrate, calcium gamma hydroxy valerate, calcium delta hydroxy valerate, barium lactate, barium alpha hydroxy butyrate, barium beta hydroxy butyrate, barium gamma hydroxy valerate, barium delta hydroxy valerate, strontium lactate, strontium alpha hydroxy butyrate, strontium beta hydroxy butyrate, strontium gamma hydroxy butyrate, strontium gamma hydroxy valerate, strontium delta hydroxy valerate, magnesium lactate, magnesium gamma hydroxy valerate, magnesium delta hydroxy butyrate, magnesium gamma hydroxy butyrate, magnesium gamma hydroxy valerate, agnesium delta hydroxy valerate, zinc lactate, zinc alpha hydroxy butyrate, zinc beta hydroxy butyrate, zinc gamma hydroxy butyrate, zinc gamma hydroxy valerate and zinc delta hydroxy valerate. Representative examples of salts of dicarboxylic acids are calcium malonate, calcium succinate, calcium glutarate, calcium adipate, calcium pimelate, barium malonate, barium succinate, barium gluterate, barium adipate, barium pimelate, strontium malonate, strontium succinate, strontium glutarate, strontium adipate, strontium pimelate, magnesium malonate, magnesium succinate, magnesium adipate, magnesium pimelate, zinc malonate, zinc glutarate, zinc adipate and zinc pimelate.

The amount of the Group II metal compound used will ordinarily be very small. Usually the amount will be in the range of from 0.0001 to 0.1 percent and preferably in the range of from 0.001 to 0.01 percent by weight based on the dicarboxylic acid esters used.

The invention has been illustrated with particular respect to the use of the manganese salts of n-octanoic acid and 2-ethyl hexanoic acid as catalysts. Manganese salts of other octanoic acids can also be used. Representative examples of such acids are 3-ethyl hexanoic acid and 2-propyl pentanoic acid.

Manganese octoate can be used as the sole ester interchange catalyst. However, as shown above, it is advantageous to use it in combination with a compound of a metal of Group II of the periodic chart of the elements for the ester interchange reaction. Usually for the condensation reaction an additional catalyst is used. Antimony compounds are particularly effective condensation catalysts and act conjointly with the ester interchange catalyst present to promote the condensation of the glycol esters formed in the alcoholysis reaction to form high molecular weight polymers in shortened reaction periods. Various antimony compounds can be used such as antimony acetate, antimony trioxide, antimony glycolate and other glycol soluble antimony compounds. The condensation catalyst can be added to the reactants along with the ester interchange catalysts at the beginning of the alcoholysis reaction, or, if desired, can be added to the glycol esters formed by such reaction prior to the start of the condensation reaction.

The amount of catalyst used can be varied over a wide range of concentration. As is usual with catalysts, the amount used will be relatively small. As a general rule the amount will be within the range of from 0.001 to 0.1 percent of manganese octoate (0.00015 to 0.015 calculated as manganese metal) based on the ester of dicarboxylic acid used when it is used as the sole interchange catalyst. When used in combination with a compound of a metal of Group II of the periodic chart of the elements the amount of manganese octoate used will be in the range of from 0.001 to 0.1 percent and the amount of the Group II metal compound used will be in the range of from 0.00001 to 0.001 percent all calculated as the metal and based on the weight of the diesters used. The antimony condensation catalyst is used in the amount of from 0.001 to 0.05 percent (calculated as antimony metal) based on the ester of dicarboxylic acid used.

The practice of this invention has been illustrated with particular respect to the preparation of polymeric ethylene terephthalate. Polymeric ethylene isophthalate and copolyesters containing various ratios of ethylene terephthalate to ethylene isophthalate and other polyesters can similarly be made using the catalyst of the invention.

The examples illustrate the invention using the dimethyl esters of terephthalic acid and ethylene glycol. The invention is effective with other esters, such as the ethyl, propyl, butyl and phenyl esters of the phthalic acids and of other aromatic and aliphatic acids. Thus the catalyst combination can be used in the preparation of polyesters derived from other acids and/or other glycols. Representative examples of such other acids are aliphatic acids of the formula

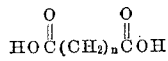

where X is hydrogen and $n$ is zero to ten, such as oxalic acid, malonic acid, succinic acid, glutaric acid, adipic acid, sebacic acid, suberic acid, etc.; methyl succinic acid, alpha methyl adipic acid; aromatic acids, such as the phthalic acids, the naphthalene dicarboxylic acids, the diphenyl dicarboxylic acids; and araliphatic acids such as alpha, beta-diphenyl ethane-4,4-dicarboxylic acid, alpha,beta-diphenyl butane-4,4'-dicarboxylic acid. Representative examples of other glycols that can be used are trimethylene glycol, tetramethylene glycol, pentamethylene glycol, hexamethylene glycol, decamethylene glycol, alkyl-substituted polymethylene glycols such as 2,2-dimethyl 1,3-propane diol, 2,2-diethyl 1,3-propane diol, diethylene glycol, 2,2-bis[4-(beta-hydroxyethoxy)phenyl] propane and cyclohexane dimethanol. The phthalic acids and ethylene glycol are preferred because of their low cost and ready availability. Thus in a preferred embodiment ethylene glycol is reacted with a bis ester of at least one acid selected from the group consisting of terephthalic acid and isophthalic acid and the resulting glycol ester or low polymer thereof condensed to form a high molecular weight linear polyester in the presence of the catalyst of the invention.

While certain representative embodiments and details have been shown for the purpose of illustrating the invention it will be apparent to those skilled in this art that various changes and modifications may be made therein without departing from the spirit or scope of the invention.

What is claimed is:

1. In a process for preparing a highly polymeric linear polyester by subjecting at least one bis ester of a dicarboxylic acid to alcoholysis in the presence of an excess of a glycol and thereafter condensing the glycol ester formed, with the removal of glycol, the improvement which comprises conducting both the alcoholysis and the condensation in the presence of a catalyst amount of a manganese octoate.

2. The process of claim 1 in which the bis ester of dicarboxylic acid is dimethyl terephthalate.

3. The process of claim 1 in which the glycol used is selected from the group consisting of ethylene glycol, propylene glycol, tetramethylene glycol, pentamethylene glycol, hexamethylene glycol, neopentyl glycol and cyclohexane dimethanol.

4. The process of claim 1 in which the glycol used is ethylene glycol.

5. The process of claim 1 in which the glycol used is tetramethylene glycol.

6. The process of claim 1 in which the manganese octoate used is manganese-di-2-ethylhexoate.

7. In a process for preparing highly polymeric linear polyester by subjecting a bis ester of a dicarboxylic acid to alcoholysis in the presence of an excess of a glycol and thereafter condensing the glycol, the improvement which comprises conducting the alcoholysis in the presence of a catalytic composition containing from 0.001 to 0.1 percent of a manganese octoate and then conducting the condensation reaction in the presence of from 0.001 to 0.1 percent of an antimony compound and from 0.001 to 0.1 percent of a phosphite compound based on the dicarboxylic esters used.

8. The process of claim 7 in which the antimony compound used is antimony glycolate.

9. In a process for preparing highly polymeric linear polyester by subjecting a bis ester of a dicarboxylic acid to alcoholysis in the presence of an excess of a glycol and thereafter condensing the glycol ester formed, with the removal of glycol, the improvement which comprises conducting both the alcoholysis and the condensation in the presence of a catalytic composition containing from 0.001 to 0.1 percent of manganese octoate and from 0.0001 to 0.01 percent of a compound of a divalent metal selected from the metals of Group II of the periodic table of the elements, based on the dicarboxylic esters used.

10. The process of claim 9 in which the divalent metal compound used is a Group II metal salt of at least one aliphatic carboxylic acid selected from the group consisting of (a) monocarboxylic acids, (b) hydroxy monocarboxylic acids and (c) dicarboxylic acids.

11. The process of claim 10 in which the metal of said metallic salt is calcium.

12. The process of claim 10 in which the metal of said metallic salt is magnesium 13. In a process for preparing highly polymeric linear polyester which comprises subjecting a bis ester of at least one dicarboxylic acid selected from the group consisting of terephthalic acid and isophthalic acid to alcoholysis in the presence of an excess of a glycol and thereafter condensing the glycol ester formed, with the removal of glycol, the improvement which comprises conducting both the alcoholysis and condensation in the presence of catalytic compositions containing from 0.001 to 0.1 percent of manganese octoate, from 0.0001 to 0.01 percent of calcium octoate, and from 0.001 to 0.1 percent of antimony based on the bis ester used.

14. The process of preparing highly polymeric polyethylene terephthalate which comprises subjecting dimethyl terephthalate to alcoholysis in the presence of an excess of ethylene glycol and thereafter condensing the glycol ester formed with removal of glycol, the improvement which comprises carrying out both the alcoholysis and condensation in the presence of catalytic compositions containing from 0.001 to 0.1 percent of manganese octoate, from 0.0001 to 0.01 percent of calcium octoate based on the dimethyl terephthalate used.

15. In a process for preparing a diglycol ester by subjecting a di ester of a dicarboxylic acid to alcoholysis in the presence of an excess of a glycol, the improvement which comprises conducting the alcoholysis in the presence of from 0.001 to 0.1 percent of manganese octoate and from 0.0001 to 0.01 percent of calcium octoate based on the di ester of the dicarboxylic acid used.

16. In a process for preparing a diglycol ester by subjecting a di ester of a dicarboxylic acid to alcoholysis in the presence of an excess of a glycol, the improvement which comprises conducting the alcoholysis in the presence of from 0.001 to 0.1 percent of manganese octoate and from 0.0001 to 0.01 percent of magnesium octoate based on the di ester of the dicarboxylic acid used.

17. The process of preparing bis beta hydroxyethyl terethphalate by subjecting a dialkyl ester of terephthalic acid to alcoholysis in the presence of an excess of ethylene glycol, the improvement which comprises conducting the alcoholysis in the presence of from 0.001 to 0.1 percent of manganese octoate and from 0.0001 to 0.01 percent of calcium octoate based on the dialkyl ester of terephthalic acid used.

18. The process of preparing bis beta hydroxyethyl terephthalate by subjecting a dialkyl ester of terephthalic acid to alcoholysis in the presence of an excess of ethylene glycol the improvement which comprises conducting the alcoholysis in the presence of from 0.001 to 0.1 percent of manganese octoate and from 0.0001 to 0.01 percent of magnesium octoate based on the dialkyl ester of terephthalic acid used.

19. In the process of preparing an ester by alcoholysis reaction the improvement which comprises carrying out the alcoholysis in the presence of maganese octoate.

References Cited

UNITED STATES PATENTS

| | | | |
|---|---|---|---|
| 2,360,393 | 10/1944 | Burrell | 260—22 |
| 2,437,232 | 3/1948 | Rothrock et al. | |
| 2,634,278 | 4/1953 | Kuhrt | 260—22 |
| 3,002,942 | 10/1961 | Zoetbrood | 260—22 |
| 3,046,153 | 7/1962 | Unkefer et al. | 260—22 |
| 3,230,188 | 1/1966 | Peters | 260—22 |
| 2,578,660 | 12/1951 | Auspos et al. | 260—75 |
| 2,951,060 | 8/1960 | Billica | 260—75 |

FOREIGN PATENTS

| | | |
|---|---|---|
| 808,102 | 1/1959 | Great Britain. |

DONALD E. CZAJA, *Primary Examiner.*

R. W. GRIFFIN, *Assistant Examiner.*

U.S. Cl. X.R.

260—45.7, 475